US010826304B1

(12) United States Patent
Thomas et al.

(10) Patent No.: US 10,826,304 B1
(45) Date of Patent: Nov. 3, 2020

(54) BATTERY CAPACITY TRANSLATOR AND CORRESPONDING SYSTEMS AND METHODS

(71) Applicant: NuGen Systems Inc., Norcross, GA (US)

(72) Inventors: George Thomas, Lawrenceville, GA (US); Sai Praturu, Suwanee, GA (US); Ajith N Nair, Lawrenceville, GA (US); Venus Desai, Lawrenceville, GA (US)

(73) Assignee: NuGen Systems Inc., Norcross, GA (US)

( * ) Notice: Subject to any disclaimer, the term of this patent is extended or adjusted under 35 U.S.C. 154(b) by 501 days.

(21) Appl. No.: 15/358,969

(22) Filed: Nov. 22, 2016

Related U.S. Application Data (60) Provisional application No. 62/259,624, filed on Nov. 24, 2015.

(51) Int. Cl.
| | |
|---|---|
| *H02J 7/04* | (2006.01) |
| *H02J 7/16* | (2006.01) |
| *H02J 7/00* | (2006.01) |
| *H01M 10/48* | (2006.01) |
| *H01M 10/42* | (2006.01) |

(52) U.S. Cl.
CPC ....... *H02J 7/0021* (2013.01); *H01M 10/4221* (2013.01); *H01M 10/48* (2013.01); *H01M 2010/4278* (2013.01); *H01M 2220/20* (2013.01); *H02J 7/00034* (2020.01)

(58) Field of Classification Search
CPC .. H02J 7/0021; H01M 10/4221; H01M 10/48; G01R 31/3648; G01R 31/3606; G01R 31/3634
USPC ................................................. 320/107, 132
See application file for complete search history.

(56) References Cited

U.S. PATENT DOCUMENTS

| | | | |
|---|---|---|---|
| 6,653,816 B2 | 11/2003 | Peek et al. | |
| 6,707,272 B1 | 3/2004 | Thandiwe | |
| 6,879,133 B1 | 4/2005 | Geren | |
| 6,969,974 B1 | 11/2005 | Liu | |
| 7,498,772 B2 | 3/2009 | Palladino | |
| 2008/0136367 A1* | 6/2008 | Adest | H02J 7/0063 320/103 |
| 2009/0104510 A1* | 4/2009 | Fulop | H01M 2/30 429/50 |
| 2011/0267021 A1* | 11/2011 | Payson | H02M 3/00 323/299 |
| 2015/0293180 A1* | 10/2015 | Dulle | G01R 31/3658 324/431 |

* cited by examiner

*Primary Examiner* — Zixuan Zhou
(74) *Attorney, Agent, or Firm* — Philip H. Burrus, IV (57) ABSTRACT

A battery capacity translator (209) includes an input (301), an output (302), and a conversion circuit (305) coupled between the input and the output. The conversion circuit receives stored energy capacity information (701,702) corresponding to one or more energy storage cells of a first type at the input, and converts the stored energy capacity information to modeled stored energy capacity information (703) corresponding to one or more other energy storage cells of a second type. This modeled stored energy capacity information is delivered to the output to emulate the energy storage cells of the second type in legacy systems.

20 Claims, 7 Drawing Sheets

BATTERY CAPACITY TRANSLATOR AND CORRESPONDING SYSTEMS AND METHODS

CROSS REFERENCE TO PRIOR APPLICATIONS

This application claims priority and benefit under 35 U.S.C. § 119(e) from U.S. Provisional Application No. 62/259,624, filed Nov. 24, 2015, which is incorporated by reference for all purposes.

BACKGROUND

Technical Field

This disclosure relates generally to energy storage devices, and more particularly to energy storage devices for electrically powered vehicles.

Background Art

The use of electrical power to propel vehicles, as opposed to fossil fuels or natural gas, is becoming increasingly popular. This is especially true for indoor applications such as within warehouses where electrically powered forklifts, dollies, pallet jacks, and other vehicles move goods and other articles around continuously. These electrically powered vehicles typically use batteries, and in particular lead acid batteries, as onboard energy storage systems. After a certain amount of use, the vehicles are taken out of service and connected to a power supply to recharge the battery. Once the batteries have been recharged, the vehicle can resume operation. When in operation, energy from the batteries may be used not only to propel the vehicle, but also work lift devices, braking systems, lighting systems, traction control, and other systems.

Continued use of these vehicles has a direct effect on the useful life of each battery in the system. Regardless of whether a lead acid battery is a flooded lead acid battery, a valve regulated lead acid battery, an absorbed glass mat lead acid battery, a thin-plate lead acid battery, or other type, accelerated charging or discharging, as well as frequent charging or discharging, will shorten the life of a lead acid battery. In addition to charge and discharge frequency and rate, the amount of discharge occurring during each cycle also affects the useful life of the overall battery, as deeply discharging a lead acid battery accelerates aging of the battery.

These limitations cause manufacturers to "oversize" lead acid batteries to ensure an economically viable cycle life within a vehicle. Said differently, rather than select a battery having capacity X, a manufacturer will select a battery having a capacity of 5x to achieve a reasonable operation time while ensuring a reasonable cycle life for that battery. This leads to inefficiencies, due in part to the large volume and heavy weight associated with each battery. Additionally, this oversizing exacerbates health and environmental concerns associated with lead leaking out of the battery. It would be advantageous to have an improved energy storage system to power electric vehicles. It would further be advantageous to have an improved energy storage system that would work with legacy electric vehicles designed to work with lead acid batteries.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to emulating the output voltage of a lead acid battery as a function of capacity based upon capacity inputs from cells based on chemistries other than lead acid chemistries, e.g., lithium based chemistries. Any process descriptions or blocks in flow charts should be understood as representing modules, segments, or portions of code or logic that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to energy storage devices, allow non-lead acid technologies such as lithium-ion and lithium-iron-phosphate to serve as drop-in replacements for lead acid batteries in legacy electric vehicles, thereby improving the functioning of those vehicles as well as their efficiency and performance.

It will be appreciated that embodiments of the disclosure described herein may be comprised of one or more conventional processors and unique stored program instructions that control the one or more processors to implement, in conjunction with certain non-processor circuits, some, most, or all of the functions of emulating lead acid output voltages as a function of capacity as described herein. The non-processor circuits may include, but are not limited to, a radio receiver, a radio transmitter, signal drivers, clock circuits, power source circuits, and user input devices. As such, these functions may be interpreted as steps of a method to perform lead acid output voltage emulation. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. As used herein, components may be "operatively coupled" when information can be sent between such components, even though there may be one or more intermediate or intervening components between, or along the connection path. The terms "substantially" and "about" are used to refer to dimensions, orientations, or alignments inclusive of manufacturing tolerances. Thus, a "substantially orthogonal" angle with a manufacturing tolerance of plus or minus two degrees would include all angles between 88 and 92, inclusive. Also, reference designators shown herein in parenthesis indicate components shown in a figure other than the one in discussion. For example, talking about a device (10) while discussing figure A would refer to an element, 10, shown in figure other than figure A.

As alluded to above, one of the latest trends in the material handling industry is the use of electric energy storage devices in vehicles. Electric energy storage devices are displacing the common workhorse in the material handling industry, which is the internal combustion engine. Once powered by a fossil fuel such as natural gas, electric vehicles used in indoor applications are increasing relying upon lead acid batteries to power forklifts, pallet jacks, autonomous material moving vehicles, and other vehicles. The use of electric energy storage devices reduces air quality concerns in indoor applications due to the fact that no toxic or greenhouse emissions are released from electrically powered vehicles. In addition to warehouse applications, other industries are hopping on the electrification bandwagon. These industries include the use of electric vehicles in hospitals for material handling, the use of automatic guided vehicles in manufacturing operations, and so forth.

Continued use of these vehicles has a direct affect on the useful life of each battery in the system. Regardless of whether a lead acid battery is a flooded lead acid battery, a valve regulated lead acid battery, an absorbed glass mat lead acid battery, a thin-plate lead acid battery, or other type of battery, accelerated charging or discharging, as well as frequent charging or discharging, will shorten the life of a lead acid battery. In each of these technologies, solid lead is used as anode while lead dioxide is used as the cathode. Dilute sulfuric acid solution serves as the electrolyte. When the cells of the battery discharge, lead from the anode and lead dioxide of the cathode are both converted to lead sulfate. In addition to charge and discharge rate, the amount of discharge directly affects the cycle life of the overall battery.

Illustrating by example, when a lead acid battery is fully discharged, its cycle life, i.e., the number of times it can be fully charged and discharged, will shorten. If a lead acid battery is repeatedly discharged to a point where only twenty percent of the stored energy remains, the number of times it can be charged and discharged in will be limited to a low number, such as 400. By contrast, if a lead acid battery is discharged to a point where eighty percent of the stored energy remains, its cycle life will be a far greater number, such as 2500 cycles.

This effect on cycle life frequently causes manufacturers to "oversize" lead acid batteries to ensure an economically viable cycle life within a vehicle. Said differently, rather than select a battery of size X, which would operate an electric vehicle for four hours by discharging to twenty percent, a manufacturer will instead select a battery of size 5X to achieve the four hours of operation by discharging to only eighty percent. This allows the vehicle to run for the same amount of time, but with the battery having a 2500 cycle life instead of a 400-cycle life.

While practically effective, this oversizing creates many problems. First, it causes the batteries to be far more expensive. Second, it causes the batteries to be far heavier. Third, it causes the batteries to be far larger. Fourth, the vehicles using the batteries must be larger and carry more weight, and are thus less efficient. Fifth, as noted above, large batteries must have robust housings and mechanical components to prevent lead from leaking out of the battery, as leaked lead is not only an environmental concern, but is also toxic material to humans, plants, and animals. Sixth, disposing of used lead acid batteries can be harmful to the environment and requires expensive post processing steps. Seventh, maintenance of lead acid batteries is more costly than is maintenance of other types of batteries.

Yet another problem with lead acid batteries is that they have extremely low charge and discharge efficiencies. This is true regardless of size. The rate at which a battery can be charged is frequently expressed as a function of its capacity. Thus, if a battery can hold 120 ampere-hours of energy, a "1-C" charge rate or discharge rate would be 120 amperes. Said differently, a 1-C charge rate of a battery can be thought of as the current at which the battery can be charged to full capacity in one hour.

For lead acid batteries, regardless of type, the maximum charge rate is only about 0.5 C. Thus, if a lead acid battery has a capacity of 10 ampere-hours, the maximum current that can be used to charge the battery is 5 amperes. This is due to the chemical reaction that must occur during the energy storage process. It should be noted that this charge rate is far lower than the discharge rate of the same battery due to the fact that the charge process is influenced by parameters such as temperature and specific design of the battery. Accordingly, the time required to fully charge a lead acid battery may be five to six hours. A complete discharge and recharge during a conditioning process can take thirteen hours or more. Complicating matters, to ensure a reasonable cycle life the battery must rest without charge or discharge for at least an hour prior to use. The low efficiency of the charging process greatly increases cost to end users when employing lead acid batteries in electric vehicles.

Embodiments of the disclosure therefore contemplate that it would be advantageous to replace lead acid batteries with other technologies. This is desirable because it could reduce environmental and toxic implications associated with lead acid batteries, reduce the size of the energy storage system in an electric vehicle, reduce the weight of the energy storage system, decrease the time required to recharge the energy storage system, and extend the cycle life of the energy storage system, just to name a few of the advantages. However, embodiments of the disclosure also contemplate that most legacy electric vehicles are specifically designed to work with lead acid technologies, and that converting or retrofitting these vehicles to be compatible with other chemistries is cost prohibitive.

Accordingly, embodiments of the present disclosure provide an improved energy storage system that includes a battery management system with circuitry to control and manage one or more non-lead acid battery cells. Embodiments of the disclosure contemplate that lithium-based chemistries, and in particular lithium-ion and lithium-iron-phosphate technologies are highly desirable for use in electronic vehicle applications due to their higher energy per mass and higher energy per volume characteristics. Additionally, lithium-based cells can be charged at incredibly higher rates than can lead acid batteries. For example, a typical lithium ion cell can be charged at a 5-C rate, which is ten times faster than a corresponding lead acid battery.

While electric vehicle usage will be employed as an explanatory application for ease of illustration, it should be noted that embodiments of the disclosure are applicable to numerous other applications as well. For instance, embodiments of the disclosure could be used in any robotic vehicles, robots, drones, or automation machines that use lead acid batteries as a primary energy source. Still other applications will be obvious those of ordinary skill in the art having the benefit of this disclosure.

In one or more embodiments, the battery management system includes fuel-gauging circuitry with enhanced functions to receive cell capacity information from cells of a first type and to output voltages indicating capacity of cells of a second type. Illustrating by example, in one embodiment, the battery management system receives energy storage information represented in ampere-hours from lithium-ion or lithium-iron-phosphate cells, and converts that to an output voltage indicative of the energy stored in a lead acid battery. In addition to generating an output voltage indicative of the corresponding energy stored in a lead acid battery, in one or more embodiments the battery management system can also include serial bus, parallel bus, wireless, or other types of communication to deliver data concerning the energy storage system to a remote device.

In one or more embodiments, the battery management system includes a battery capacity translator that transforms fuel gauge circuitry output into voltage output. For instance, in one embodiment the battery capacity translator converts percentages of remaining capacity, expressed in ampere-hours, into voltage values. Adaptive scaling circuitry can be used to transform voltage output of one type of battery to another type. Methods can include setting the scaled parameters to mimic different battery chemistries. Methods can further enhance fuel gauging systems with an adaptive scaled parameter function that scales voltage values corresponding to the states of charge to emulate any of lead acid batteries, lithium ion batteries, lithium-iron-phosphate batteries, supercapacitors, and so forth.

In one or more embodiments, a battery capacity translator includes an input and an output. A conversion circuit is coupled between the input and the output. The conversion circuit receives stored energy capacity information corresponding to one or more energy storage cells of a first type at the input. The conversion circuit then converts the stored energy capacity information to modeled stored energy capacity information corresponding to one or more other energy storage cells of a second type. The conversion circuit then delivers the modeled stored energy capacity information to the output.

Illustrating by example, in one embodiment the energy storage cells of the first type are lithium based. They can be lithium-ion, lithium-polymer, lithium-iron-phosphate, or another type of lithium-based chemistry. In one embodiment, fuel-gauging circuitry determines stored energy capacity information defined as a function of current. For example, a Coulomb counter may count the number of Coulombs that enter the lithium-based cells when charging, or leave the lithium-based cells when discharging. The Coulomb counter thus maintains a record of the energy stored in the lithium-based cells, i.e., the stored capacity, as a function of the current delivered to, or from, those cells.

In one or more embodiments, the conversion circuit receives this stored energy capacity information and converts it to modeled stored energy capacity information. In one or more embodiments, this modeled stored energy capacity comprises an output voltage. For instance, a digital-to-analog converter, a digital potentiometer, or an analog scaling circuit can convert fuel gauge information from lithium-based cells to an output voltage to emulate a lead acid battery. This allows embodiments of the present disclosure to serve as drop-in replacements for lead acid batteries in legacy electric vehicles, while at the same time bringing all of the advantages of lithium technology and eliminating the disadvantages of lead technology to indoor vehicular applications. Other desirable features and characteristics of embodiments of the disclosure will be obvious to those of ordinary skill in the art having the benefit of this disclosure.

Figure 1:
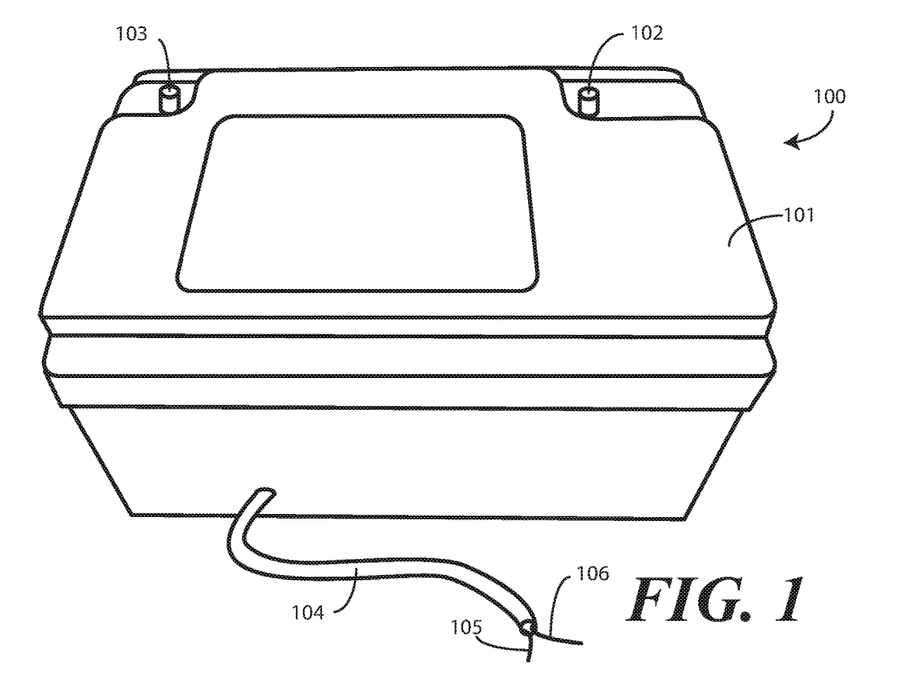
FIG. 1 illustrates one explanatory energy storage device in accordance with one or more embodiments of the disclosure.

Turning now to FIG. 1, illustrated therein is one explanatory energy storage system 100 configured in accordance with one or more embodiments of the disclosure. The energy storage system 100 includes a housing 101. In this illustrative embodiment, the housing 101 resembles a conventional lead acid battery due to the fact that the energy storage system 100 is configured to function as a drop-in replacement for a lead acid battery in an electric vehicle application. Other shapes for the housing 101 will be obvious to those of ordinary skill in the art having the benefit of this disclosure.

In one or more embodiments, the housing 101 houses one or more energy storage devices. Examples of the energy storage devices include lithium ion batteries, lithium-iron-phosphate batteries, supercapacitors, and so forth. Still other energy storage devices will be obvious to those of ordinary skill in the art having the benefit of this disclosure.

In one or more embodiments, one or more cathodes of each energy storage device are coupled to a positive terminal 102, which is configured here as a terminal post. The energy storage devices housed within the housing 101 can be coupled in series, parallel, or combinations thereof. Where coupled in parallel, all cathodes will be coupled to the positive terminal 102. Where coupled in series, one cathode will be coupled to the positive terminal 102. Where coupled in a series-parallel combination, one or more cathodes will be coupled to the positive terminal 102.

Similarly, in one or more embodiments one or more anodes of the energy storage devices can be coupled to a negative terminal 103, which is also configured as a terminal post in this illustrative embodiment. As with the cathodes, depending upon the series or series-parallel or parallel coupling of the energy storage devices, one, two or more, or all anodes of the energy storage devices can be coupled to the negative terminal 103.

In one or more embodiments, the energy storage system 100 comprises more than two terminals, i.e., more than just the positive terminal 102 and the negative terminal 103. In one embodiment, the energy storage system 100 comprises more than two terminals but less than five terminals. In this illustrative embodiment, the energy storage system 100 comprises four terminals.

To wit, in addition to the positive terminal 102 and the negative terminal 103, in this illustrative embodiment the energy storage system comprises a capacity sensing terminal 104. The capacity sensing terminal 104 includes both a positive terminal sense line 105 and a negative terminal sense line 106. The positive terminal sense line 105 and the negative terminal sense line 106 can be used to sense the series voltage of the energy storage devices housed within the housing 101. Accordingly, high currents for charging the energy storage devices or powering electric vehicles can be delivered to and from the positive terminal 102 and the negative terminal 103, while low current capacity measurements can be made by sensing the voltage at the positive terminal sense line 105 and the negative terminal sense line 106. As will be described in more detail with reference to FIG. 2 below, additional terminals could be included, such as serial or parallel communication ports.

Figure 2:
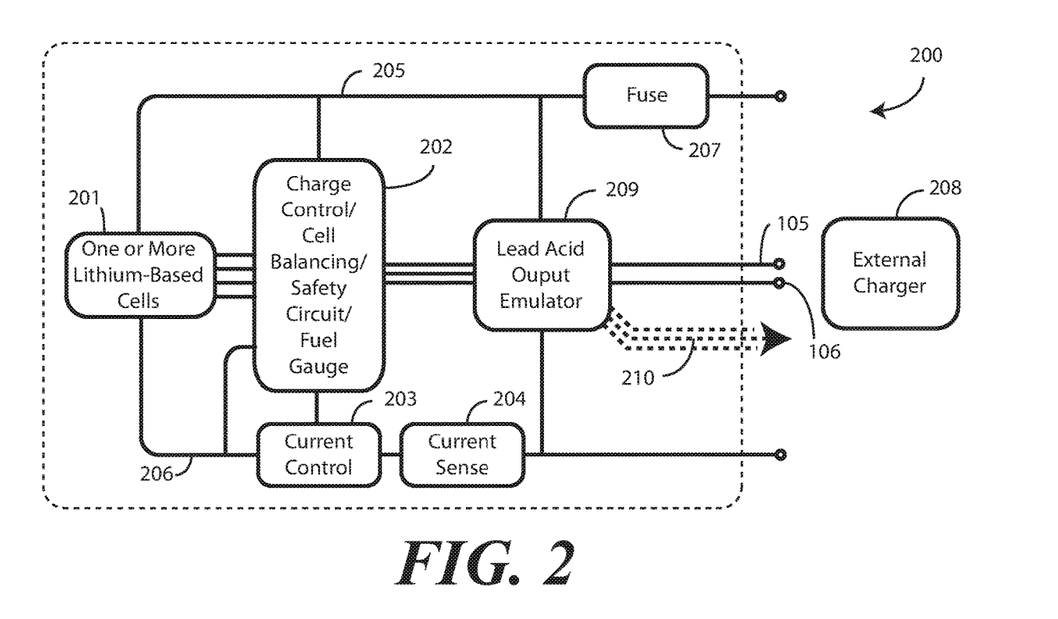
FIG. 2 illustrates a schematic block diagram of one explanatory energy storage device in accordance with one or more embodiments of the disclosure.

Turning now to FIG. 2, illustrated therein is one explanatory schematic block diagram 200 of an energy storage system in accordance with one or more embodiments of the disclosure. The schematic block diagram 200 is configured to facilitate the charging and discharging of one or more cells 201. In one embodiment, the one or more cells 201 comprise lithium-based cells. For example, in one embodiment the one or more cells 201 comprise a plurality of lithium ion cells. In another embodiment, the one or more cells comprise a plurality of lithium-iron-phosphate cells. Other types of cells will be obvious to those of ordinary skill in the art having the benefit of this disclosure. For example, the lithium-based cells could be replaced with one or more supercapacitors. As noted above, the one or more cells 201 can be coupled together in series, parallel, or combinations thereof.

In one or more embodiments, a control circuit 202 configured to control the amount of charging current that flows to, or from, the one or more cells 201. A serial fuse 207 can also be used to limit available current from the one or more cells 201. In one or more embodiments, the control circuit 202 employs a current control circuit 203 to regulate and/or limit the amount of charge or discharge current. For example, the current control circuit 203 can include one or more field effect transistors (FETs) and one or more diodes. The diodes can be in addition to the FETs, such as when only one FET is used, or can be integrally formed with the FETs. The current control circuit 203 can be operable with current sensor 204, which can comprises a sense resistor or other current sense device.

The control circuit 202 can determine suitable currents for charging the one or more cells 201 by reading data stored in a memory of the control circuit 202. In some embodiments, the control circuit 202 can monitor other conditions of the one or more cells 201, such as measuring the temperatures of the one or more cells 201. In operation, when a charger 208 delivers current to the one or more cells 201, the control circuit 202 monitors the amount of charging current with the current sensor 204. The voltage applied to the battery one or more cells 201 can be sensed from the electrical terminals 205,206. During the charging process, in addition to monitoring charging current and charging voltage, the control circuit 202 can monitor the temperature of the one or more cells 201 to ensure that the temperature remains within the thermal limitations set by the manufacturer. If the temperature rises above a predetermined threshold, the control circuit 202 can reduce the amount of current using the current control circuit 203 to avoid compromising the reliability of the one or more cells 201.

In addition to charge and discharge control, in one or more embodiments the control circuit 202 can also perform cell-balancing operations. For example, the control circuit 202 can use a series of switches and other components to equalize the voltages of each cell of the one or more cells 201. This balancing reduces differences of the voltages to maximize the stored energy capacity of the system. Cell balancing allows lesser-charged cells to become more fully charged, as well as increasing the amount of usable energy in the system.

The control circuit 202 can balance cells in one of a few ways. In one embodiment, the control circuit 202 can balance the cells by discharging cells having higher voltages. In another embodiment, the control circuit 202 can transfer energy from cells having higher voltages to cells having lower voltages. Other techniques for balancing cells will be obvious to those of ordinary skill in the art having the benefit of this disclosure.

The control circuit 202 can also perform fuel-gauging operations. Lithium-base cells, as will be shown and described in more detail below, have relative flat voltage curve characteristics during discharge. Said differently, the voltage of most lithium-based cells stays essentially constant until the cell basically "dies" from a lack of stored energy. Due to this flat discharge curve, lithium-based systems frequently use fuel-gauging circuits that incorporate "Coulomb counters" to measure the amount of power delivered to, or discharged from, the cell by integrating current across time. Using this method, in one or more embodiments the control circuit 202 "counts" the Coulombs of current flowing in or out of the one or more cells 201, and adds or subtracts this count to or from a total capacity stored in memory to obtain the current stored energy capacity, in ampere-hours, of the one or more cells 201. Other fuel gauging techniques will be obvious to those of ordinary skill in the art having the benefit of this disclosure.

In one or more embodiments, the fuel-gauging circuitry of the control circuit 202 measures accurately the charge that is going into, or out of, the one or more cells 201 during charging or discharging. Upon demand, the control circuit 202 can deliver this information to the battery capacity translator 209. This information can be delivered in various forms, including a percentage of total capacity of the battery that is remaining in the battery. Such data is commonly known to those skilled in the art as "percent RSOC" or "percent SOC" or "percent DOD" or "charge state." These terms may be used interchangeably.

In one or more embodiments, a battery capacity translator 209 is coupled between the control circuit 202 and the positive terminal sense line 105 and the negative terminal sense line 106. In the illustrative embodiment of FIG. 2, the battery capacity translator 209 is labeled as a "lead acid output emulator." This is because in one illustrative embodiment, the battery capacity translator receives stored energy capacity information corresponding to the one or more cells 201, which are lithium-based cells, and converts the stored energy capacity information to modeled stored energy capacity information, which in one embodiment is an output voltage indicating an amount of energy stored in a lead acid battery. In effect, the battery capacity translator 209 "tricks" any device coupled to the positive terminal sense line 105 and the negative terminal sense line 106 into thinking that the one or more cells 201 are in fact those of a lead acid battery, when they are actually of another chemistry type such as lithium-based. This allows the system to serve as a drop-in replacement in electric vehicles designed to operate with lead acid technologies.

In addition to being coupled to the positive terminal sense line 105 and the negative terminal sense line 106, in one or more embodiments the battery capacity translator 209 further includes a communication port 210 that can be used to communicate data about the one or more cells 201 to remote devices. In one embodiment, the communication port 210 comprises a serial communication bus. In another embodiment, the communication port 210 comprises a parallel communication bus. In another embodiment, the communication port 210 comprises a wireless communication connection. Other types of communication ports will be obvious to those of ordinary skill in the art having the benefit of this disclosure.

The communication port 210 can use standard protocols like I2C/SPI/SMBus/CAN bus protocols for data transmission. Data transferred across the communication port 210 can include details of cell voltages, state of charge, remaining capacity, temperature, error conditions, fault states, and so forth. Other information suitable for communication across the communication port 210 will be obvious to those of ordinary skill in the art having the benefit of this disclosure.

Figure 3:
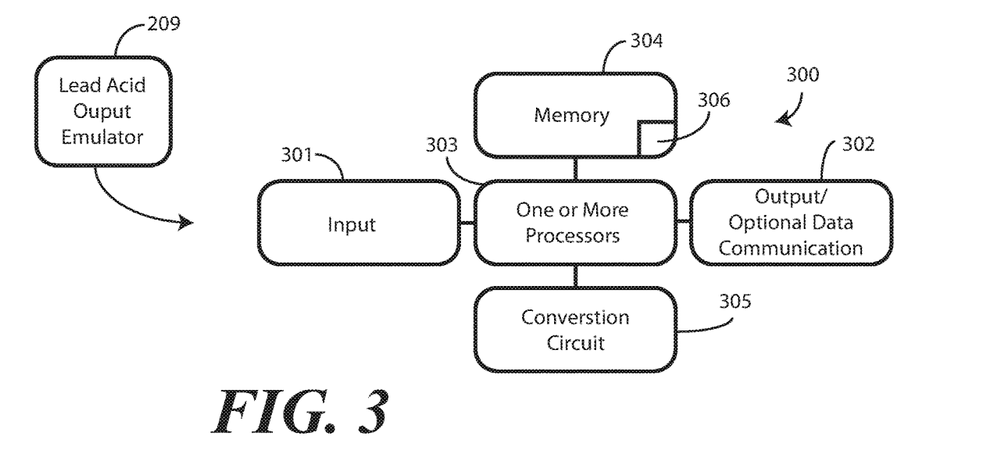
FIG. 3 illustrates one explanatory lead acid output emulator in accordance with one or more embodiments of the disclosure.

Turning now to FIG. 3, illustrated therein is a schematic block diagram 300 of one explanatory battery capacity translator 209 configured in accordance with one or more embodiments of the disclosure. The battery capacity translator 209 includes an input 301 and an output 302. The input 301 can couple to the control circuit (202) of FIG. 2. The output 302 can couple to the positive terminal sense line (105) and the negative terminal sense line (106) in one or more embodiments.

The output 302 can also include a wired or wireless communication circuit to communicate across the communication port (210) as well. The wireless communication circuit can be configured for wired or wireless communication with one or more other devices or networks. The output 302 can utilize wireless technology for communication, such as, but are not limited to, peer-to-peer or ad hoc communications such as HomeRF, Bluetooth and IEEE 802.11 (a, b, g or n); and other forms of wireless communication such as infrared technology. The output 302 can include wireless communication circuitry, one of a receiver, a transmitter, or transceiver, and one or more antennas 126.

Coupled between the input 301 and the output 302 are one or more processors 303. The one or more processors 303 can be a microprocessor, a group of processing components, one or more ASICs, programmable logic, or other type of processing device. The one or more processors 303 can be operable with the various components of the schematic block diagram 300 of FIG. 3 or the schematic block diagram (200) of FIG. 2. The one or more processors 303 can process and execute executable software code to perform the various functions of the battery capacity translator 209. A storage device, such as memory 304, can optionally store the executable software code used by the one or more processors 303 during operation.

The one or more processors 303 can be responsible for performing the primary functions of the battery capacity translator 209. The executable software code used by the one or more processors 303 can be configured as one or more modules that store instructions, control algorithms, and so forth, and are stored in the memory 304.

In one or more embodiments, the battery capacity translator 209 also includes a conversion circuit 305. In one or more embodiments, the conversion circuit 305 is operable with the one or more processors 303 to convert stored energy capacity information received from the input 301, and corresponding to one or more cells of a first type, to modeled stored energy capacity information corresponding to one or more other energy storage cells of a second type. The conversion circuit 305 can then deliver the modeled stored energy capacity information to the output 302.

For instance, when the stored energy capacity information received from the input 301 corresponding to the cells of a first type is defined as a function of current, e.g., a number of ampere-hours, in one embodiment the conversion circuit 305 converts this information to modeled stored energy capacity information comprising an output voltage. This output voltage can then be delivered to the output 302, which in turn deliver it to the positive terminal sense line (105) and the negative terminal sense line (106) to "fake out" an external device configured to work only with lead acid batteries.

Figure 9:
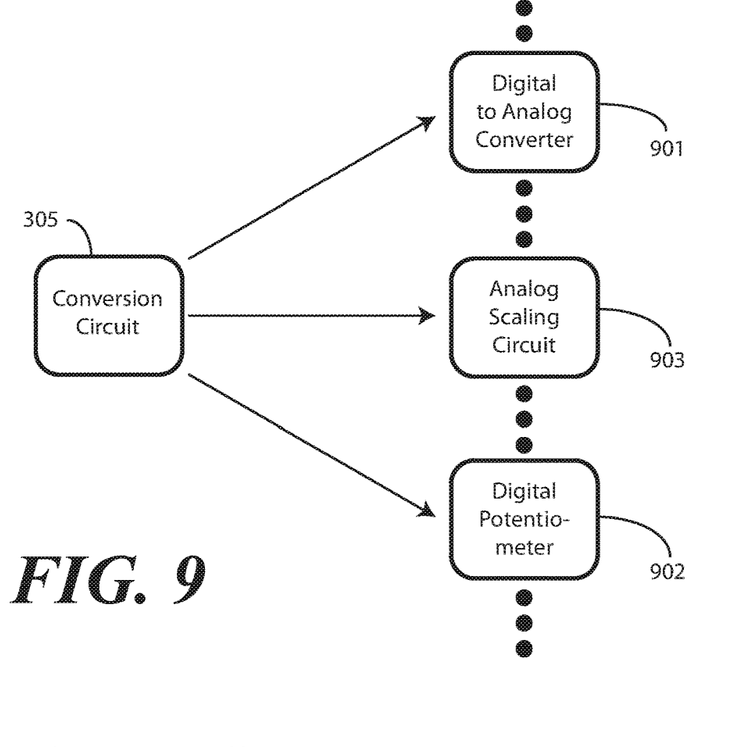
FIG. 9 illustrates one or more examples of conversion circuits operable in lead acid output emulators configured in accordance with one or more embodiments of the disclosure.

The conversion circuit 305 can take any of a number of forms. Turning briefly to FIG. 9, in one embodiment the conversion circuit 305 comprises a digital-to-analog converter 901. In another embodiment, the conversion circuit 305 comprises a digital potentiometer 902. In yet another embodiment, the conversion circuit 305 comprises an analog scaling circuit 903. Still other types of conversion circuits 305 configured to convert stored energy capacity information corresponding to cells of a first type to modeled stored energy capacity information corresponding to one or more other energy storage cells of a second type will be obvious to those of ordinary skill in the art having the benefit of this disclosure.

Turning back to FIG. 3, in one embodiment the memory 304 comprises a conversion table 306. In one embodiment, the conversion table 306 comprises entries of percentages discharge of one or more energy storage cells of the first type and corresponding entries of terminal voltages of the one or more other energy storage cells of the second type. In one embodiment, each percentage and terminal voltage corresponds to each other on a one-to-one basis. Accordingly, in one or more embodiments the conversion circuit 305 can consult the conversion table 306 stored in memory 304 when converting the stored energy capacity information to the modeled stored energy capacity information. One example of such a conversion table 306 is set forth here:

TABLE 1

| Depth of Discharge, Lithium-Based Cells (percentage) | Lead Acid Terminal Voltage under Discharge (volts) | Lithium-Based Cell Lead Acid Equivalent under Discharge (volts) | Lithium-Based Cell Lead Acid Equivalent Coulombs Remaining (A-h) | Output of Battery Capacity Translator (volts) |
|---|---|---|---|---|
| 0 | 12.75 | 20.16 | 1C * 0 | 12.6 |
| 20 | 12.40 | 19.68 | 1C * 0.80 | 12.4 |
| 40 | 12.15 | 19.56 | 1C * 0.60 | 12.25 |
| 50 | 12.03 | 19.50 | 1C * 0.50 | 12.00 |
| 60 | 11.91 | 19.44 | 1C * 0.40 | 11.85 |
| 80 | 11.56 | 19.08 | 1C * 0.20 | 11.60 |
| 90 | 11.25 | 18.78 | 1C * 0.10 | 11.25 |
| 100 | 10.50 | 12.00 | 1C * 0.00 | 10.50 |

This conversion table 306 shows a correlation, based upon experimental testing, of the output voltage of a traditional lead acid battery corresponding to an amount of discharge, i.e., a remaining stored energy capacity, and to a remaining Coulomb equivalent from lithium-based cells serving in the same functional role as would the cells of a lead acid battery. Accordingly, when receiving stored energy capacity of one or more cells represented as a percent discharge, the conversion circuit 305 can convert these percentages to a predefined output voltage by referencing the conversion table 306. Similarly, when receiving stored energy capacity of one or more cells represented in ampere-hours, the conversion circuit 305 can convert these percentages to a predefined output voltage by referencing the conversion table 306.

The data from Table 1 can be communicated from the battery capacity translator (209) at a data output terminal as pseudo-voltage values scaled to mimic the voltage values of a lead acid battery at its various points of states of charge or depth of discharge as shown below in FIG. 4. A certain percentage of the depth of discharge of the lithium-based cell is given arbitrarily a voltage value. An example of a typical embodiment is shown in Table 1. The voltage vs. depth of discharge of a typical lead acid battery and that of the exemplary lithium-based battery is listed in Table 1. The conversion circuit (305) of embodiments of the disclosure transforms the voltage values in an artificial way to mimic the voltage profile of the typical lead acid battery.

Figure 4:
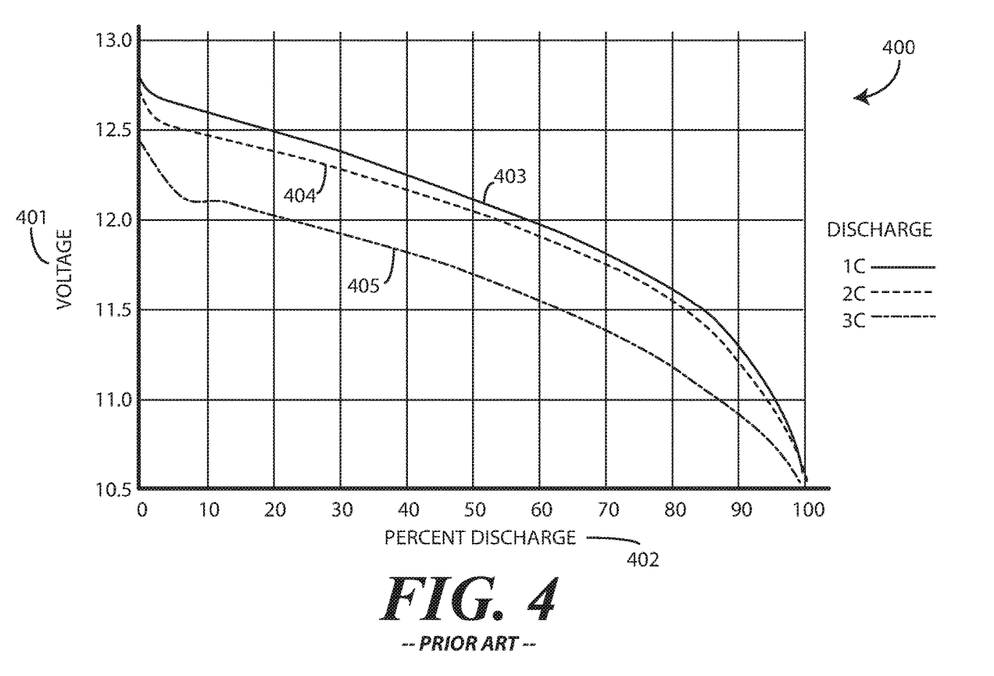
FIG. 4 illustrates prior art discharge curves associated with lead acid batteries.
Figure 5:
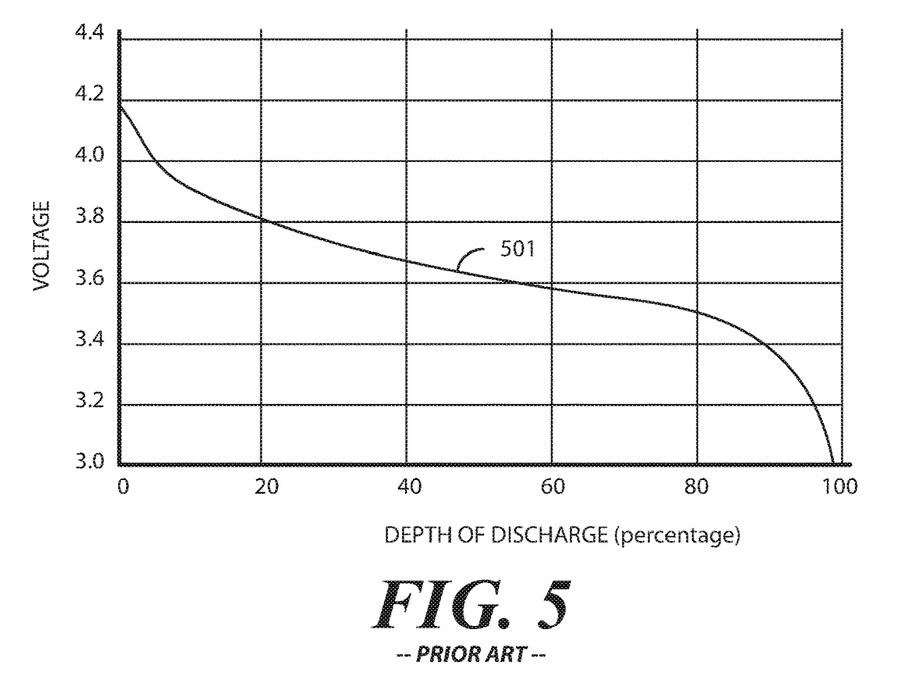
FIG. 5 illustrates prior art discharge curves with lithium-ion based batteries.
Figure 6:
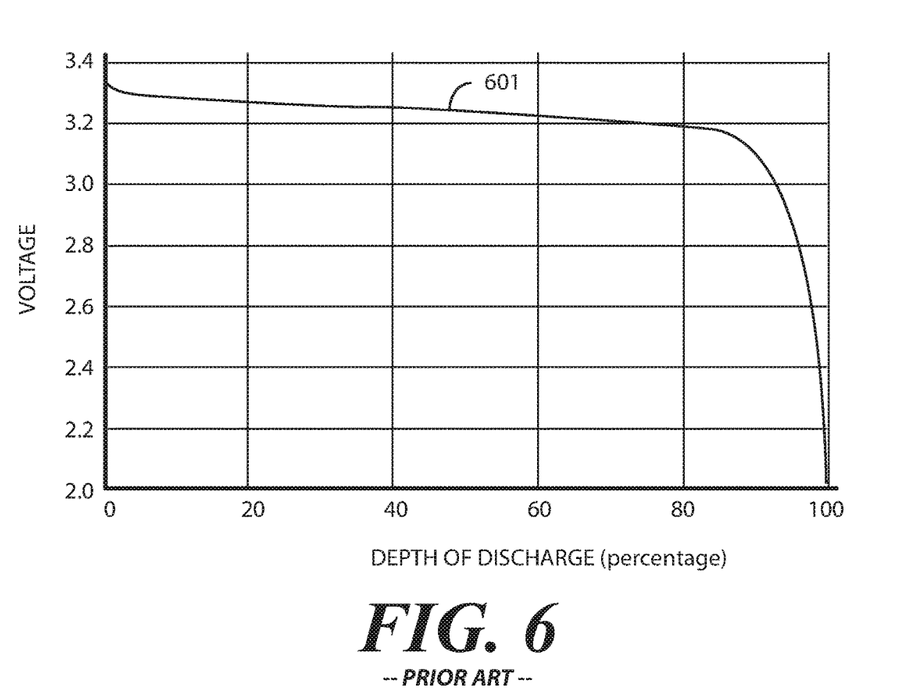
FIG. 6 illustrates prior art discharge curves of lithium-iron-phosphate based batteries.

FIGS. 4-6 illustrate the origins of this conversion table 306. Turning now to FIG. 4, illustrated therein is a graph 400 of discharge curves of a typical lead acid battery that depicts the change in output voltage 401 versus depth of discharge 402. Discharge curve 403 depicts the voltage decrease as a function of depth of discharge when the output current is a 1-C current. Discharge curve 404 illustrates the voltage decrease as a function of depth of discharge when the output current is a 2-C current. Similarly, discharge curve 405 illustrates the depth of discharge when the output current is a 3-C current. As can be seen in each of these graphs, as a traditional lead acid battery discharges, the output voltage drops from somewhere between 12.5 and 13.0 volts to about 10.5 volts.

Electric vehicles designed to operate with lead acid batteries as energy storage devices use a simple fuel gauging process that is solely based upon the output voltage. These systems understand that the lead acid battery discharges when electric power is being drawn from the battery to power the vehicles, thereby decreasing the output voltage. As noted above, the ability to recharge a lead acid battery, measured in terms of cycle life, will decrease rapidly if the batteries are discharged to 10.5 volts during every cycle. On the other hand, the longest cycle life is achieved if lead acid batteries are partially discharged to a depth of discharge of about twenty percent, which means that eighty percent of the total amount of energy the lead acid battery can store remains stored therein when the battery is recharged. Conventional electric vehicles therefore monitor the output voltage to estimate the remaining capacity stored within the battery. When the battery reaches a particular voltage selected by the vehicle manager, e.g., 12.0 volts, the vehicle is taken out of service and the battery is charged.

This voltage-based charging decisioning does have drawbacks. For example, the voltage measurement is frequently inaccurate and can lead to a shortened cycle life. Nonetheless, it is the method of choice employed by numerous electric vehicle manufacturers around the globe who design lead-acid powered vehicles.

This fact creates a problem when one desires to replace the lead acid battery with another battery chemistry or power source. To wit, replacement of lead acid batteries with another battery requires replacement of battery management systems, charging systems, fuel gauging systems, and so forth. New battery management protocols and algorithms are required, which means new components must be integrated into the vehicle. This is costly and time consuming.

Advantageously, embodiments of the present disclosure provide an alternate chemistry with a battery capacity translator that allows the use of an alternate chemistry in a lead acid-based legacy vehicle. Additionally, embodiments of the disclosure allow owners of conventional electric vehicles to switch between lead acid and lithium or other chemistries at any time. In one or more embodiments, the battery capacity translator receives stored energy capacity information corresponding to one or more energy storage cells of a first type, e.g., lithium-ion cells, at an input and converts the stored energy capacity information to modeled stored energy capacity information corresponding to one or more other energy storage cells of a second type, e.g., lead acid cells. This modeled stored energy capacity information is then delivered to an output so that conventional lead acid battery management systems can make conventional charging decisions based upon voltage fuel gauging while using an alternate chemistry and without the need to retrofit the vehicle.

Embodiments of the disclosure contemplate that lithium-based cells, e.g., lithium ion cells, are superior in performance when compared to lead acid batteries in terms of power capabilities, weight, size, and longevity. Additionally, lithium-based cells do not have any risk of lead leaking from the batteries, and are often considered a "green" alternative to lead acid. Many versions of lithium-based chemistries are available, including C/LiCoO.sub.2 cells, C/LiMn.sub.2O.sub.4, C/Li (NMC)O.sub.2, C—Si/Li (NMC)O.sub.2, LiFePO.sub.4, and so forth. The discharge curves in terms of output voltage as a function of depth of discharge are varied and different.

Illustrating by example, and turning now to FIG. 5, illustrated therein is a discharge curve 501 of a lithium ion cell as a function of the depth of discharge. It is clear that this discharge curve 501 is quite different from the discharge curves (403,404,405) of FIG. 4. If a conventional fuel gauging circuit received this discharge curve 501 as an input, charging decisions would unavailable or erroneous.

Turning now to FIG. 6, illustrated therein is a discharge curve 601 of another common lithium-based chemistry, namely, lead-iron-phosphate, LiFePO.sub.4, which is also known as "LFP." LFP is advantageous for use with electric vehicles due to its long cycle life and fast recharge rate, among other reasons. However, as can be seen by comparing the discharge curve 601 to that of lead acid batteries shown in FIG. 4, this discharge curve 601 is relatively flat during most of the discharge. By contrast, a lead acid battery's discharge curve is sloping as shown in FIG. 4. What this means, again, is that a lead acid voltage-based fuel gauge would not work with the discharge curve 601 of FIG. 6 as an input. Embodiments of the disclosure thus contemplate that there exists a need for an improved energy storage device that allows lithium-based (or other chemistry) cells to be used in lead acid electric vehicles with minimal or no changes to onboard charging electronics of the vehicles and charge management systems.

Figure 7:
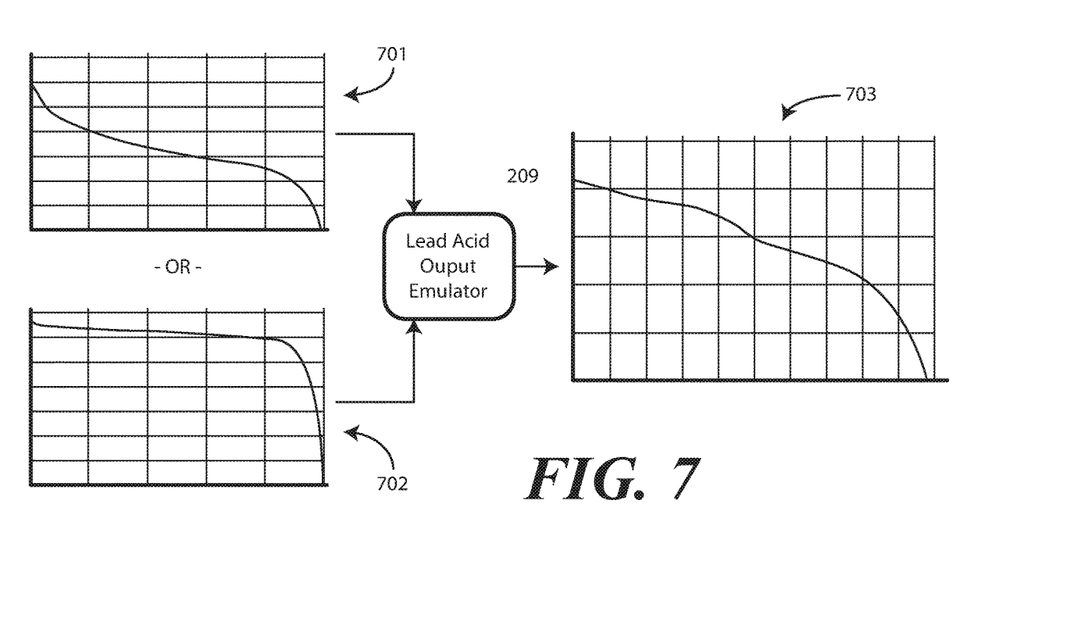
FIG. 7 illustrates operation of one explanatory lead acid output emulator configured in accordance with one or more embodiments of the disclosure.

Embodiments of the disclosure, as described above, provide such a solution. Turning now to FIG. 7, in one or more embodiments, the battery capacity translator 209 receives stored energy capacity information 701,702 in the form of fuel-gauging information represented as stored energy capacity, either in percentage terms or as a Coulomb count, and translates this information into modeled stored energy capacity information 703, represented here as a lead acid voltage output equivalent. As shown in FIG. 7, the fuel-gauging information 701,702 represents stored energy capacity information corresponding to the one or more lithium-based energy storage cells defined as a function of current. This function of current can be represented as a percent depth of discharge, a number of ampere-hours remaining in the cells, or as another function of current. The modeled stored energy capacity information, represented by the lead acid voltage output equivalent 703, comprises an output voltage. In this illustrative embodiment, the output voltage is between 10.5 and 13.0 volts, inclusive.

Figure 8:
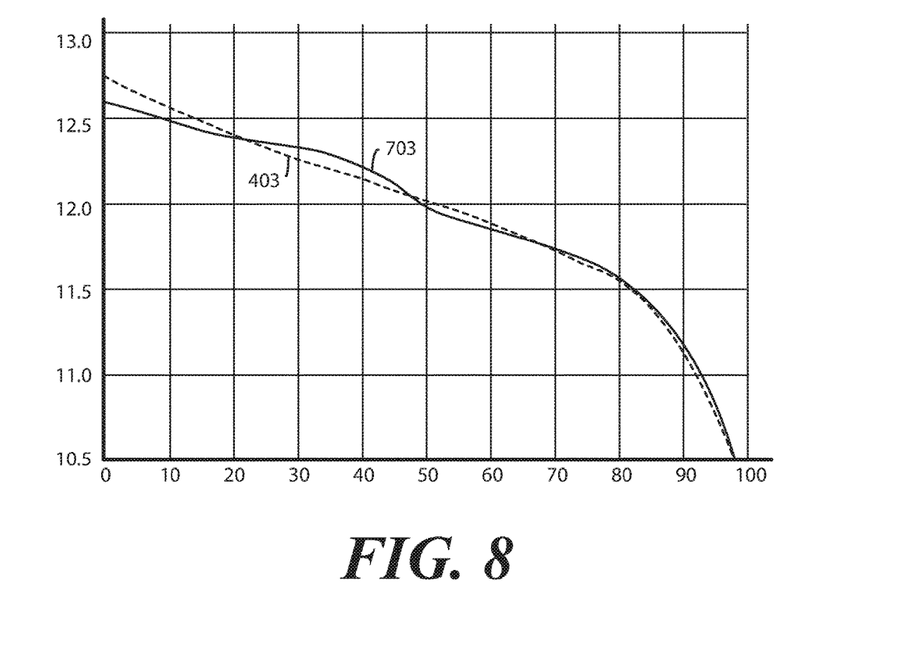
FIG. 8 illustrates operation of one explanatory lead acid output emulator configured in accordance with one or more embodiments of the disclosure.

Turning now to FIG. 8, the lead acid voltage output equivalent 703 is shown superimposed on the 1-C discharge curve 403 from FIG. 4. As shown, the battery capacity translator (209) does an excellent job of emulating the output voltage of a lead acid battery as a function of fuel-gauging information received from lithium-based cells. Accordingly, conventional charging circuitry in electric vehicles can make appropriate charging decisions without any retrofitting or modification. This allows electric vehicles to use existing lead acid voltage profiles to determine the remaining capacity of alternate chemistry cells. There is no need for new algorithms or components to be added to use lithium-based cells. The inclusion of a battery capacity translator (209) allows for easy updating or programmability to be able to emulate the voltage profile of lead acid batteries, thereby giving the user the freedom to use lithium-based cells, other cells, supercapacitors, or traditional lead acid cells in their energy storage devices.

In one or more embodiments, the voltage-scaling curve, i.e., the voltage output equivalent 703, can be used by devices monitoring or operating with the system during both charging and discharging. For example, the battery capacity translator (209) can be used by the host vehicle or an external device to monitor the state of health of the one or more cells and can use the emulated voltage as feedback to make intelligent decisions regarding conserving of energy. The vehicle or external device can also use the voltage output equivalent 703 can also be used to provide feedback for safety and machine operating conditions. The voltage output equivalent 703 can be monitored during machine or apparatus normal operating conditions or when the machine or apparatus is at rest.

Figure 10:
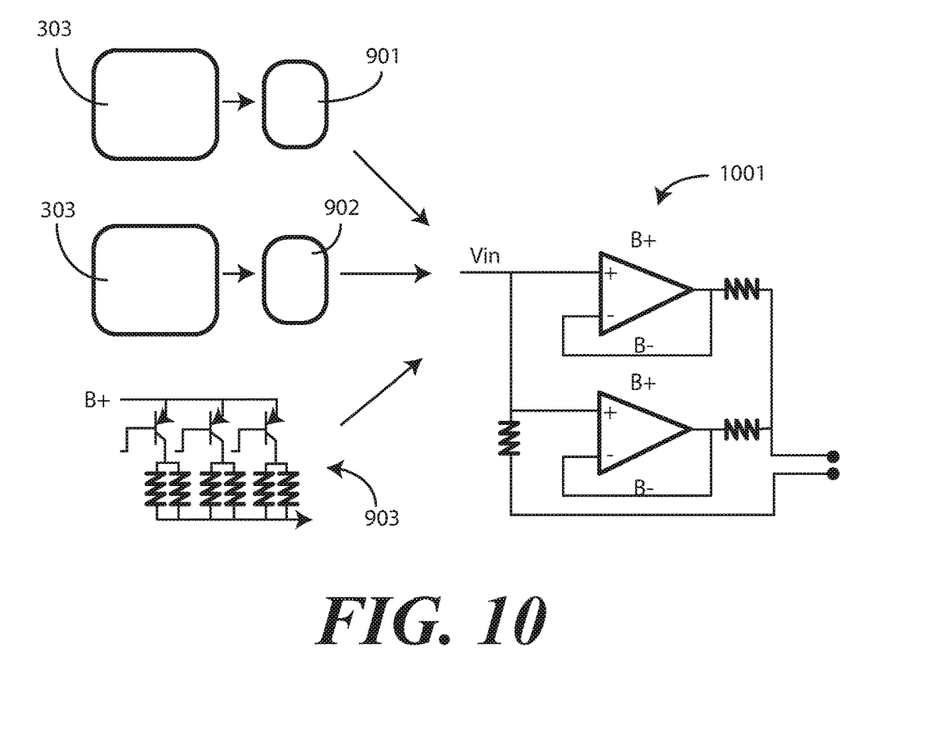
FIG. 10 illustrates one explanatory analog scaling circuit in accordance with one or more embodiments of the disclosure.

Turning now to FIG. 10, more detailed embodiments of various conversion circuits that can be used in accordance with one or more embodiments of the disclosure are shown. As noted above, in one embodiment the conversion circuit (305) comprises a digital-to-analog converter 901 that is operable with one or more processors 303 of the battery capacity translator (209). In another embodiment, the conversion circuit 305 comprises a digital potentiometer 902 that is operable with one or more processors 303 of the battery capacity translator (209). In yet another embodiment, the conversion circuit 305 comprises an analog scaling circuit 903. Analog voltage scaling can be done with any of these components. This schema can be used to generate a profile for any chemistry battery.

When using the digital-to-analog converter 901, the one or more processors 303 receive stored energy capacity information (701,702) corresponding to one or more energy storage cells of a first type and use a conversion table (306) to translate these values to a scaled analog output voltage using the digital-to-analog converter 901. The output of the digital-to-analog converter 901 can then be buffered and amplified with an output circuit 1001.

When using the digital potentiometer 902, the one or more processors 303 receive stored energy capacity information (701,702) corresponding to one or more energy storage cells of a first type and use a conversion table (306) to translate these values to a scaled analog output voltage using the digital potentiometer 902. The output of the digital potentiometer 902 can then be buffered and amplified with an output circuit 1001. The digital potentiometer 902 enables more precise control and simplifies the design.

When using the analog scaling circuit 902, discrete non-microcontroller based logic receives the stored energy capacity information (701,702) corresponding to one or more energy storage cells of a first type in the form of digital or analog signals. These signals are used to switch a ratio metric voltage divider, whose values are fixed to mimic a lead acid battery profile. The output of the analog scaling circuit 903 can then be buffered and amplified with an output circuit 1001. The simplicity of this circuit enables quick implementation and a low cost solution and enables the host station to interface to different chemistry batteries.

Figure 11:
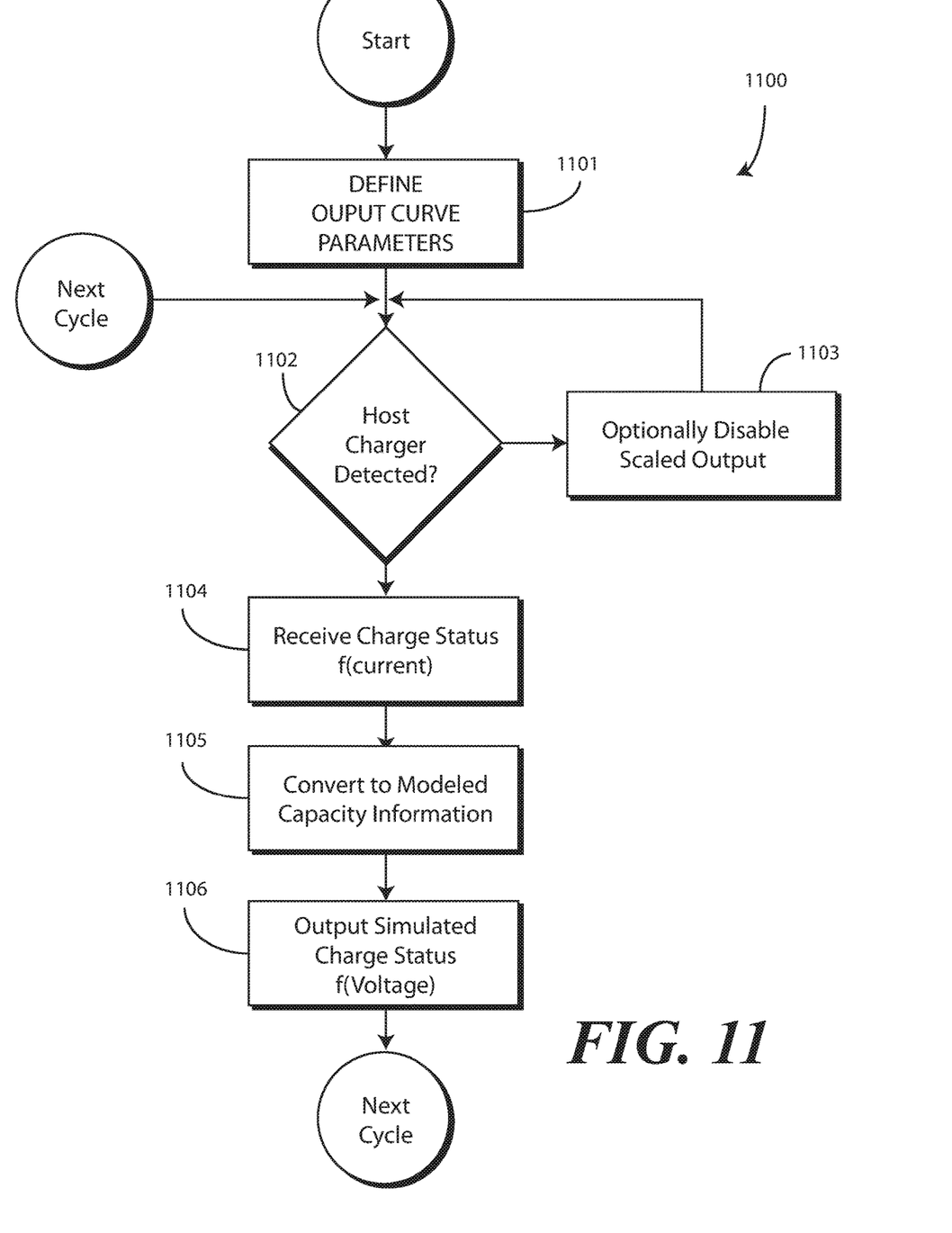
FIG. 11 illustrates one explanatory method in accordance with one or more embodiments of the disclosure.

Turning now to FIG. 11, illustrated therein is one illustrative method 1100 in accordance with one or more embodiments of the disclosure. Beginning at step 1101, if a conversion table is used, the conversion table for the cells and cell chemistry of choice are defined. In one or more embodiments, this step 1101 comprises communicating digital data identifying the modeled stored energy capacity information a battery capacity translator. In one or more embodiments, this step 1101 comprises programming the battery capacity translator with the conversion table as well.

At decision 1102, the method 1100 detects an external charger coupled to the battery capacity translator. In one or more embodiments, the converting of fuel gauge or other stored energy capacity information to modeled stored energy capacity information, as well as outputting the modeled stored energy capacity information, occurs only when the external charger is coupled to the battery capacity translator. Accordingly, optional step 1103 comprises disabling the conversion and output when no external device is coupled to the battery capacity translator.

At step 1104, the method 1100 receives stored energy capacity information corresponding to one or more energy storage cells of a first type at an input of the battery capacity translator. In one embodiment, the one or more energy storage cells of the first type comprise lithium-based energy storage cells. In one embodiment, the stored energy capacity information corresponding to the one or more lithium-based energy storage cells is defined as a function of current. For example, a percent discharge or a number of Coulombs remaining may be received at step 1104.

At step 1105, the method 1100 comprises converting, with the battery capacity translator, the stored energy capacity information to modeled stored energy capacity information corresponding to one or more other energy storage cells of a second type. In one embodiment, the one or more other energy storage cells of the second type comprise lead acid energy storage cells. In one embodiment, the modeled stored energy capacity information comprises an output voltage. In one embodiment, the output voltage is between 10.5 and 13.0 volts, inclusive.

At step 1106, the method 1100 includes outputting the modeled stored energy capacity information at an output of the lead acid battery voltage simulator. In one or more embodiments, step 1106 can include communicating digital data identifying the modeled stored energy capacity information to an external device. This communication can deliver any parameters, which the host system needs from the battery. These parameters can be provided via the dynamic scaled voltage transformation technique using wired (contact or connector based) or wireless (non-contact) data transfer scheme.

Figure 12:
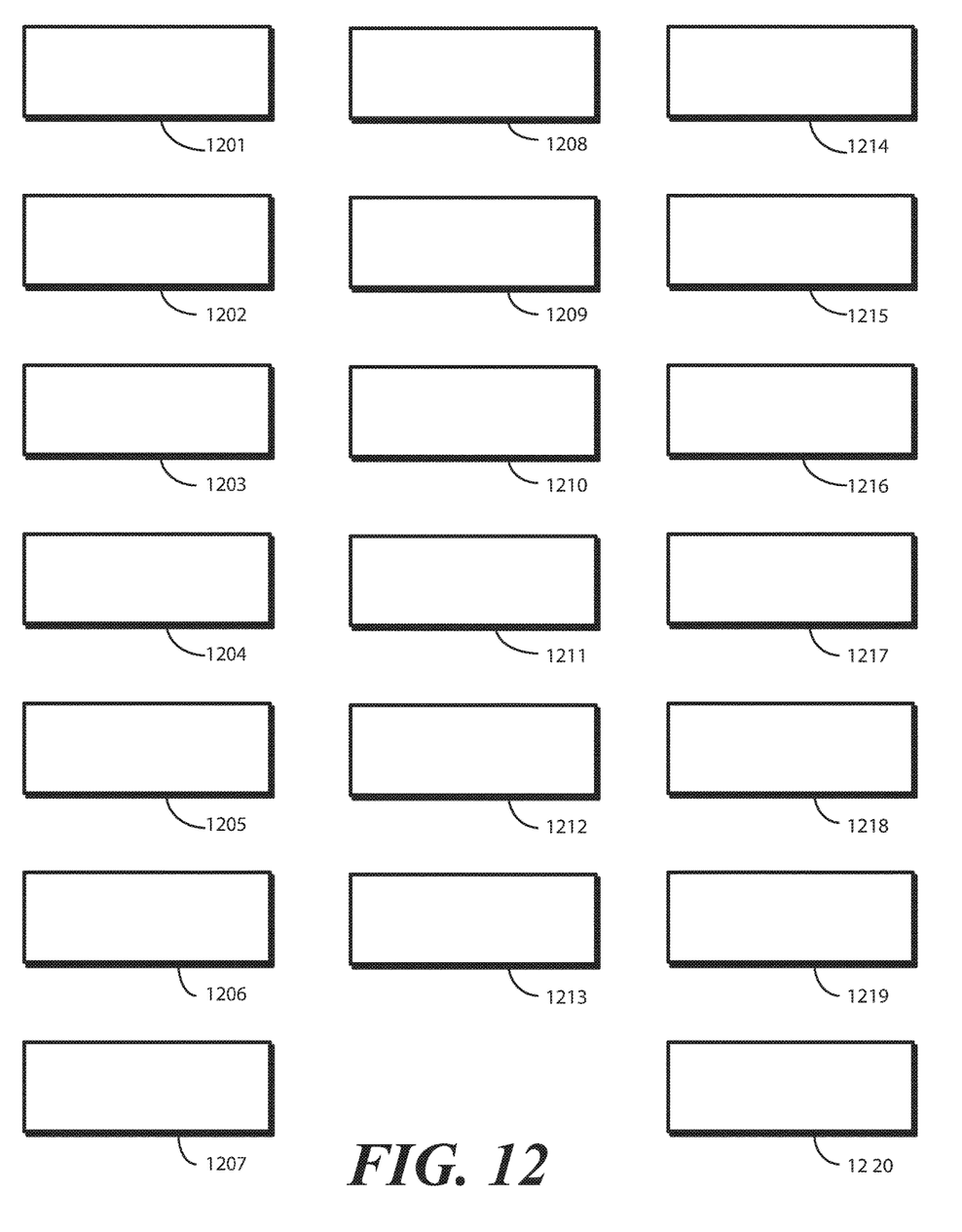
FIG. 12 illustrates one or more embodiments of the disclosure.

Turning now to FIG. 12, illustrated therein are various embodiments of the disclosure. At 1201, a method comprises receiving, with a battery capacity translator, stored energy capacity information corresponding to one or more energy storage cells of a first type at an input of the battery capacity translator. At 1201, the method comprises converting, with the battery capacity translator, the stored energy capacity information to modeled stored energy capacity information corresponding to one or more other energy storage cells of a second type. At 1201, the method comprises outputting the modeled stored energy capacity information at an output of the lead acid battery voltage simulator.

At 1202, the one or more energy storage cells of the first type of 1201 comprise lithium-based energy storage cells. At 1203, the one or more other energy storage cells of the second type of 1201 comprise lead acid energy storage cells. At 1204, the stored energy capacity information of 1201 corresponding to the one or more lithium-based energy storage cells is defined as a function of current. At 1205, the modeled stored energy capacity information of 1201 comprises an output voltage. At 1206, the output voltage is between 10.5 and 13.0 volts, inclusive.

At 1207, the method of 1201 further comprises programming the battery capacity translator with a reference table, wherein the converting comprises accessing the reference table. In one or more embodiments, the reference table can be programmed—or reprogrammed—as many times as needed. For example, if the inherent characteristics of the one or more cells change for any reason, the reference table can be reprogrammed into the memory. One key aspect associated with embodiments of the disclosure is that any of the values in the table, including the voltage numbers for the legacy lead acid batteries are programmable. This programmability is of interest because different customers may use different types of batteries and voltage thresholds. The programmability of the reference table provides the ability to selectively choose and customize values to different applications.

At 1208, the method of 1201 further comprises detecting an external charger coupled to the battery capacity translator. At 1208, the converting and outputting of 1201 only occur when the external charger is coupled to the battery capacity translator. At 1209, the method of 1201 further comprises communicating digital data identifying the modeled stored energy capacity information to an external device.

At 1210, a battery capacity translator comprises an input, an output, and a conversion circuit coupled between the input and the output. At 1210, the conversion circuit receives stored energy capacity information corresponding to one or more energy storage cells of a first type at the input. At 1210, the conversion circuit converts the stored energy capacity information to modeled stored energy capacity information corresponding to one or more other energy storage cells of a second type. At 1210, the conversion circuit delivers the modeled stored energy capacity information to the output.

At 1211, the stored energy capacity information corresponding to the one or more energy storage cells of the first type of 1210 is defined as a function of current. At 1212, the modeled stored energy capacity information of 1210 comprises an output voltage.

At 1213, the conversion circuit of 1210 comprises a digital-to-analog converter. At 1214, the conversion circuit of 1210 comprises a digital potentiometer. At 1215, the conversion circuit of 1210 comprises an analog scaling circuit.

At 1216, the one or more energy storage cells of the first type of 1210 comprise lithium-based cells. At 1217, the lithium-based cells of 1216 comprise LiFePO$_4$ cells. At 1218, the one or more energy storage cells of the second type at 1216 comprise lead acid cells.

At 1219, the battery capacity translator of 1210 further comprises a memory operable with the conversion circuit. At 1219, the conversion circuit references a conversion table stored in memory when converting the stored energy capacity information to the modeled stored energy capacity information corresponding. At 1220, the conversion table of 1219 comprises entries of percentages discharge of the one or more energy storage cells of the first type and corresponding entries of terminal voltages of the one or more other energy storage cells of the second type, with each percentage and terminal voltage corresponding on a one-to-one basis.

As shown and described, embodiments of the disclosure are concerned with the methods and systems to dynamically emulate the characteristics of a battery with a different chemistry. In one or more embodiments, the voltage vs. depth of discharge of a battery, represented by a discharge curve, is transformed into that of a battery with a different chemistry. Embodiments of the disclosure allow for discharge curves associated with lithium-based cells to dynamically transform to discharge curves associated with lead acid batteries. Embodiments of the disclosure are applicable to batteries of any chemistry where one battery type can emulate another battery.

Additional advantages offered by embodiments of the disclosure relate to electric vehicles. The vehicles and the charger in that system are programmed to operate with a battery of a particular chemistry, and most commonly lead acid battery. Embodiments of the disclosure contemplate that it is advantageous to use lithium-based batteries to power such vehicles instead of lead acid batteries. As legacy vehicles are designed to only work with lead acid batteries, embodiments of the disclosure offer users of such vehicles the freedom of simple selection of battery chemistry of their choosing.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

What is claimed is:

1. A method, comprising:
   receiving, with a battery capacity translator, stored energy capacity information corresponding to one or more energy storage cells of a first type at an input of the battery capacity translator; and
   converting, with the battery capacity translator, the stored energy capacity information to modeled stored energy capacity information corresponding to one or more other energy storage cells of a second type;
   detecting an external charger coupled to the battery capacity translator; and
   outputting the modeled stored energy capacity information at an output of the battery capacity translator;
   wherein the converting and outputting only occur when the external charger is coupled to an output of the battery capacity translator.

2. The method of claim 1, wherein the one or more energy storage cells of the first type comprise lithium-based energy storage cells.

3. The method of claim 2, wherein the one or more other energy storage cells of the second type comprise lead acid energy storage cells.

4. The method of claim 3, wherein the stored energy capacity information corresponding to the lithium-based energy storage cells is defined as a function of current.

5. The method of claim 4, wherein the modeled stored energy capacity information comprises an output voltage.

6. The method of claim 5, wherein the output voltage is between 10.5 and 13.0 volts, inclusive.

7. The method of claim 1, further comprising programming the battery capacity translator with a reference table, wherein the converting comprises accessing the reference table.

8. The method of claim 1, further comprising determining, with a control circuit, a charging current to be delivered to the one or more energy storage cells of a first type from the external charger.

9. The method of claim 1, further comprising communicating digital data identifying the modeled stored energy capacity information to an external device.

10. A battery capacity translator, comprising:
    an input;
    an output; and
    a conversion circuit coupled between the input and the output, the conversion circuit receiving stored energy capacity information corresponding to one or more energy storage cells of a first type at the input, converting the stored energy capacity information to modeled stored energy capacity information corresponding to one or more other energy storage cells of a second type, detecting an external charger coupled to the battery capacity translator, and delivering the modeled stored energy capacity information to the output, wherein the outputting only occurs when the external charger is coupled to the output of the battery capacity translator.

11. The battery capacity translator of claim 10, wherein the stored energy capacity information corresponding to the one or more energy storage cells of the first type is defined as a function of current.

12. The battery capacity translator of claim 11, the modeled stored energy capacity information comprising an output voltage.

13. The battery capacity translator of claim 12, the conversion circuit comprising a digital-to-analog converter.

14. The battery capacity translator of claim 12, the conversion circuit comprising a digital potentiometer.

15. The battery capacity translator of claim 12, the conversion circuit comprising an analog scaling circuit.

16. The battery capacity translator of claim 10, the one or more energy storage cells of the first type comprising lithium based cells.

17. The battery capacity translator of claim 16, the lithium based cells comprising $LiFePO_4$ cells.

18. The battery capacity translator of claim 16, the one or more energy storage cells of the second type comprising lead acid cells.

19. The battery capacity translator of claim 10, further comprising a memory operable with the conversion circuit, the conversion circuit referencing a conversion table selectively programmed to the memory when converting the stored energy capacity information to the modeled stored energy capacity information corresponding.

20. The battery capacity translator of claim 19, the conversion table comprising entries of percentages discharge of the one or more energy storage cells of the first type and corresponding entries of terminal voltages of the one or more other energy storage cells of the second type, with each percentage and terminal voltage corresponding on a one-to-one basis.

* * * * *